United States Patent
Rufer et al.

(10) Patent No.: US 6,567,278 B2
(45) Date of Patent: May 20, 2003

(54) ELECTRICAL POWER SUPPLY SUITABLE IN PARTICULAR FOR DC PLASMA PROCESSING

(75) Inventors: Alfred-Christophe Rufer, Villars-sous-Yens (CH); Claudio Zimmermann, Aegerten (CH); Frédéric Muller, Bulle (CH); Albert Bulliard, Marly (CH)

(73) Assignee: CP Automation S.A. (CH)

( * ) Notice: Subject to any disclaimer, the term of this patent is extended or adjusted under 35 U.S.C. 154(b) by 0 days.

(21) Appl. No.: 10/185,822

(22) Filed: Jun. 27, 2002

(65) Prior Publication Data

US 2003/0021125 A1 Jan. 30, 2003

(30) Foreign Application Priority Data

Jul. 16, 2001 (EP) .............................. 01202697

(51) Int. Cl.⁷ .................... H02M 3/335; H02M 7/5387; H02M 7/68
(52) U.S. Cl. ........................ 363/17; 363/98; 363/132
(58) Field of Search ................ 363/17, 56.02, 363/98, 132

(56) References Cited

U.S. PATENT DOCUMENTS

| | | | |
|---|---|---|---|
| 4,686,615 A | * 8/1987 | Ferguson | 363/17 |
| 4,686,617 A | * 8/1987 | Colton | 363/56.1 |
| 4,761,722 A | * 8/1988 | Pruitt | 363/17 |
| 5,448,467 A | * 9/1995 | Ferreira | 363/17 |
| 5,451,962 A | * 9/1995 | Steigerwald | 342/175 |
| 5,461,297 A | 10/1995 | Crawford | 320/1 |
| 5,541,827 A | * 7/1996 | Allfather | 363/17 |
| 5,930,122 A | 7/1999 | Moriguchi et al. | 363/17 |
| 6,310,785 B1 | 10/2001 | Ayyanar et al. | 363/17 |

OTHER PUBLICATIONS

R. Ayyanar, et al., "A Novel Soft–Switching DC–DC Converter With Wide ZVS–Range and Reduced Filter Requirement", *30th Annual IEEE Power Electronics Specialists Conference, Pesc 99*. Record. Charleston, Annual Power Electronics Specialists Conference, N.Y., N.Y., vol. 1, 1999, pp. 433–438.

R. Ayyanar, et al., "An Improved Full–ZVS–Range Hybrid DC–DC Converter With Low Filter Requirement Capable of Adding and Subtracting the Controlled and Uncontrolled Sections", *31st Annual IEEE Power Electronics Specialists Conference, Pesc 00*. Conference Proceedings, Galway, Ireland, Jun. 18–23, 2000, Annual Power Electronics Specialists Conference, N.Y., N.Y., vol. 1 of 3, Conf. 31, Jun. 18, 2000, pp. 179–184.

European Search Report.

* cited by examiner

*Primary Examiner*—Bao Q. Vu
(74) *Attorney, Agent, or Firm*—Ostrolenk, Faber, Gerb & Soffen, LLP

(57) ABSTRACT

A power supply comprising a DC-DC converter which comprises (a) a first transformer (11);
(b) a second transformer (12);
(c) a first H-bridge switching circuit (13) for selectively connecting a primary DC source (14) to the primary winding of said first transformer;
(d) a second H-bridge (15) switching circuit for selectively connecting said primary DC source (14) to the primary winding of said second transformer (12);
(e) a bridge rectifier circuit (16) connected to the secondary windings of said first and second transformers; and
(f) a control circuit (17) for providing sets of control pulses for effecting switching of switching elements of the first and the second H-bridge switching circuits (13, 15).

28 Claims, 16 Drawing Sheets

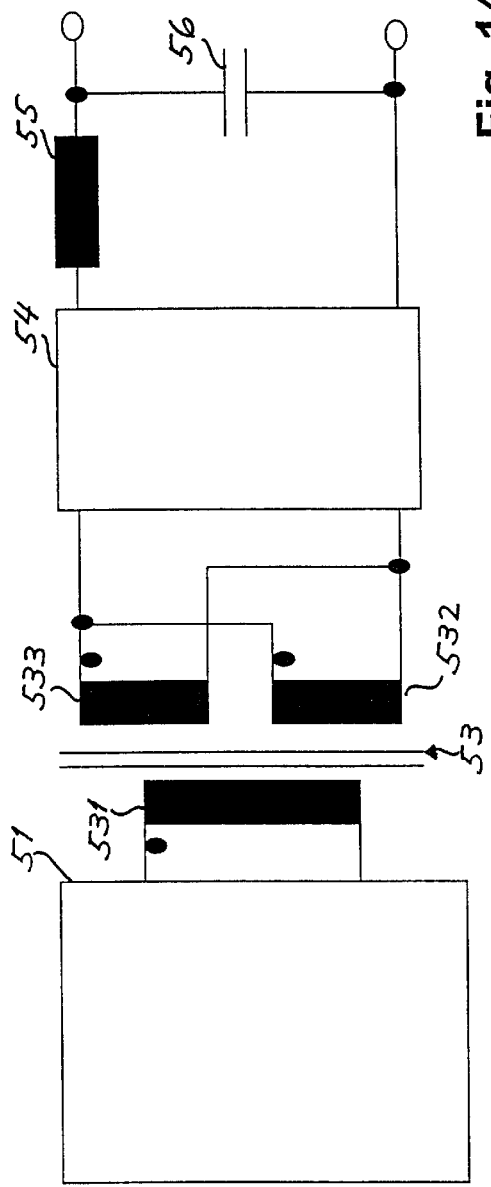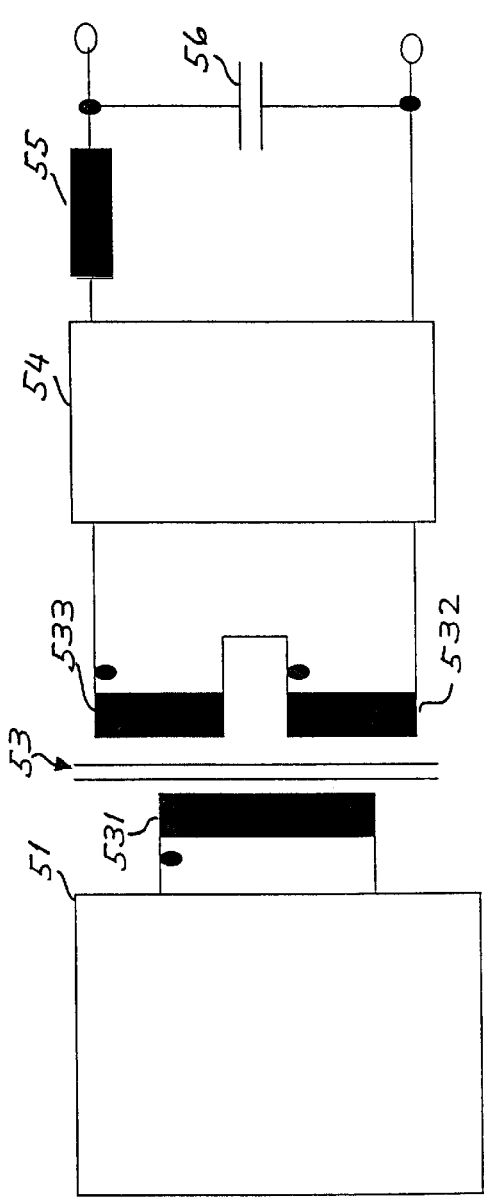

US 6,567,278 B2

1

ELECTRICAL POWER SUPPLY SUITABLE IN PARTICULAR FOR DC PLASMA PROCESSING

FIELD OF THE INVENTION

The invention concerns a power supply and in particular a power supply suitable for DC and pulsed DC plasma processing.

BACKGROUND OF THE INVENTION

A conventional power supply has the structure shown by FIG. 13 and comprises a H-bridge switching circuit 51, a transformer 52, a rectifier 54 and a filter formed by an inductor 55 and a capacitor 56. FIG. 18 shows a typical output characteristic of such a conventional power supply. As can be appreciated from FIG. 18 such an output characteristic is not suitable for applications in which the electrical load connected to the power supply varies in a broad range, like e.g. in the case of DC plasma processing where the electrical load represented by the plasma does indeed vary in a broad range. FIG. 18 shows that if the electrical load represented by the plasma requires a lower voltage and a higher current, the current capability of a conventional power supply of the type shown by FIG. 13 is relatively limited.

Prior art power supplies for DC plasma processing follow two different approaches in order to enhance the range of DC current delivered to the electrical load represented by the plasma and to obtain an output characteristic of the type represented by FIG. 19.

In a first prior art approach illustrated by FIGS. 14 and 15, the power supply has e.g. the basic structure shown by FIG. 14 which only differs from the conventional power supply shown by FIG. 13 in that a transformer 53 having a primary winding 531 and several secondary windings, e.g. two secondary windings 532, 533, is used instead of transformer 52 in FIG. 13.

Secondary windings 532, 533 can be connected either in parallel for having a low voltage and a high current capability in the case of a DC plasma processing where a low voltage is required, or in series for having a high voltage and a low current capability in the case of a DC plasma processing where a high voltage is required.

In order to increase the voltage range of the power supply shown by FIG. 14 it is necessary to change the connection of the secondary windings 532, 533 from their connection in parallel according to FIG. 14 to their connection in series according to FIG. 15. Manual change of this connection is time consuming and therefore undesirable in an ongoing DC plasma processing.

If the DC plasma processing requires to have two or more plasma types it is necessary to have two or more pre-configured power supplies in order to reduce time loss during the process. The first prior art approach is thus expensive.

In a second prior art approach illustrated by FIGS. 16 and 17, the power supply has a similar structure as in FIGS. 14 and 15, but comprises in addition switches 61, 62, 63 which make it possible to change the connection of the secondary windings 532, 533 from their connection in parallel according to FIG. 16 to their connection in series according to FIG. 17. This second prior art approach has the disadvantage that switches 61, 62, 63 can only be actuated in stand-by mode (not under electrical power) and cannot be actuated during

2 an ongoing plasma processing, because actuation of these switches under electrical power would cause electrical arcs involving the contacts of the switches and would eventually burn these switches. Therefore, this second prior art approach also requires interruption of an ongoing DC plasma processing in order to change the configuration of the connections of the secondary windings 532, 533 in order to modify the output characteristic of the power supply.

SUMMARY OF THE INVENTION

A main aim of the instant invention is to provide a power supply and in particular a power supply suitable for DC plasma processing.

A further aim of the invention is to provide a power supply which is able to provide a constant electrical power to an electrical load which varies within a broad range without having to change the hardware configuration of the power supply or to use different arrangements of power supplies for different ranges of electrical power, voltage and current to be applied to such an electrical load.

A further aim of the invention is to provide a power supply which is in particular able to provide a desired constant electrical power for any value of the variable voltage across the electrical load represented by a plasma.

According to the invention the above aim is achieved with a power supply defined by claim 1 or 4. Preferred embodiments of a power supply according to the invention are defined by the dependent claims.

A power supply according to the invention is apt to provide a constant electrical power to an electrical load which for a given voltage varies within a broad range in a ratio of 1 to 10 or more, e.g. the electrical load represented by a plasma. Thus for a given voltage, a power supply according to the invention is apt to satisfy a corresponding variation of the current to be supplied to such an electrical load.

Moreover, a power supply according to the invention is in particular apt to provide a desired constant electrical power for any value of the variable voltage across a plasma.

BRIEF DESCRIPTION OF THE DRAWINGS

The subject invention will now be described in terms of its preferred embodiments. These embodiments are set forth to aid the understanding of the invention, but are not to be construed as limiting.

FIG. 14 shows a first connection of secondary windings according to a first prior art approach for enhancing the capabilities of a conventional power supply, FIG. 15 shows a second connection of secondary windings according to the first prior art approach illustrated by FIG. 14.

DETAILED DESCRIPTION OF THE INVENTION

First Embodiment

This embodiment is described with reference to FIGS. 1 to 4.

Figure 1:
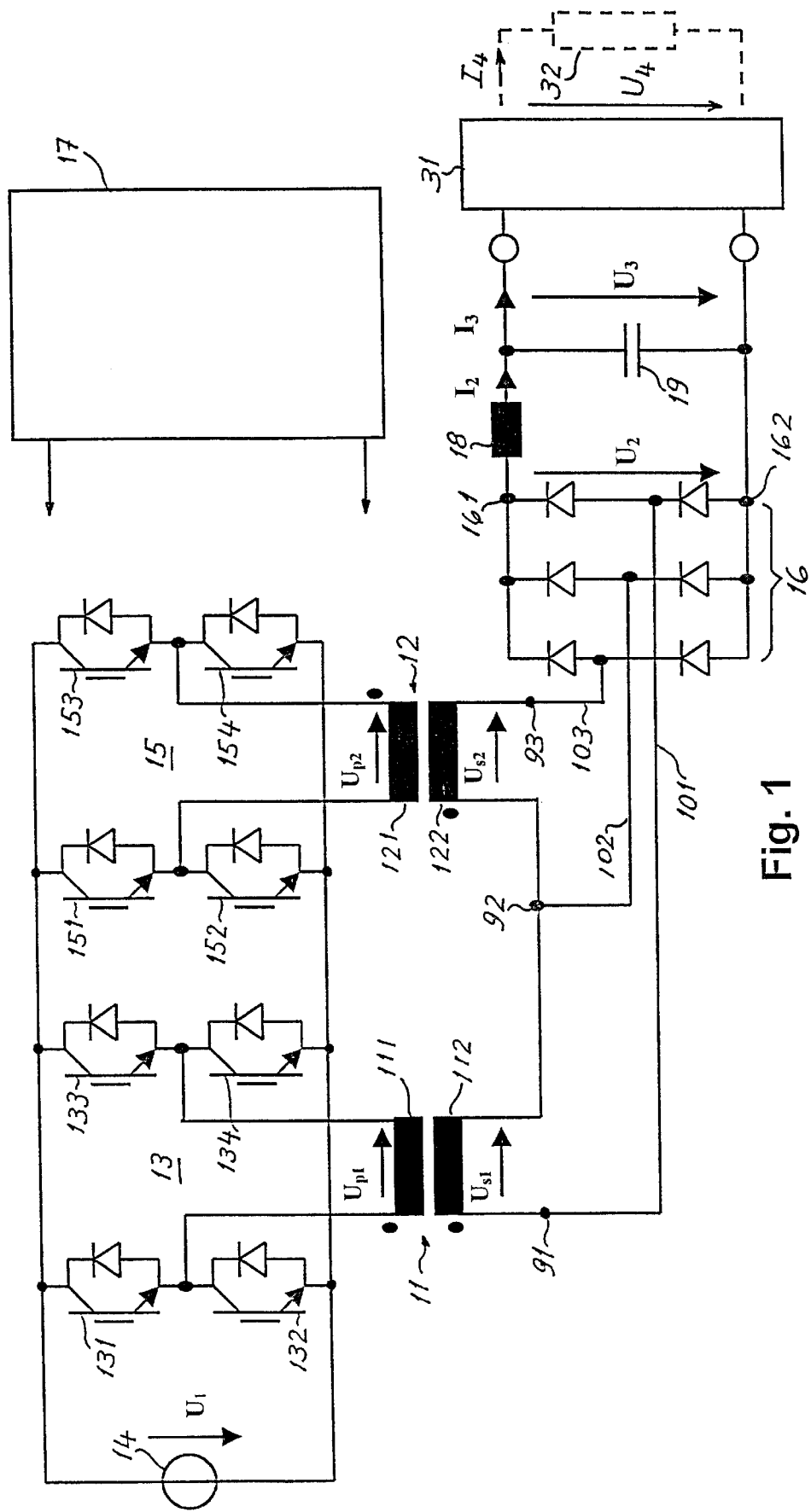
FIG. 1 shows a first embodiment of a power supply according to the invention.

FIG. 1 shows the basic structure of a power supply according to the invention.

Figure 2:
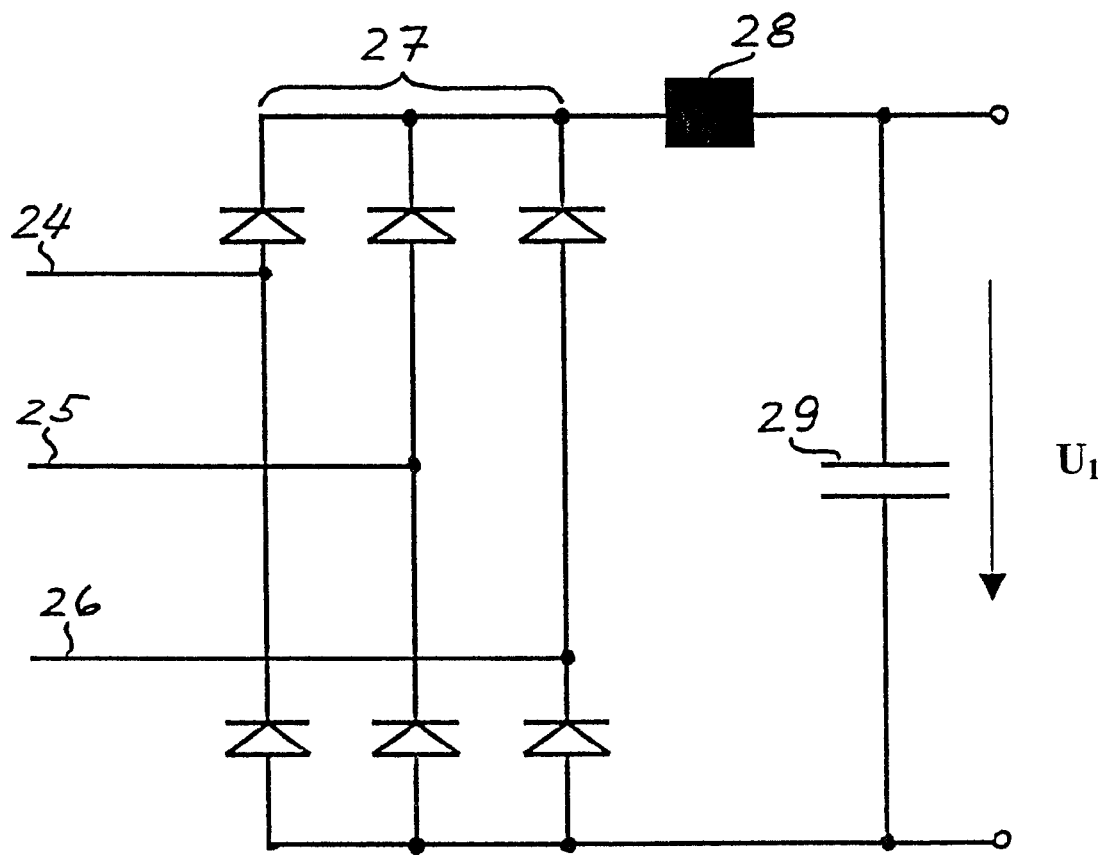
FIG. 2 shows a circuit of a primary DC source 14 shown in FIG. 1.

As can be appreciated from FIG. 1 this power supply comprises a DC-DC converter which comprises two transformers 11 and 12 having each one primary and one secondary winding, a 6-diode-bridge rectifier 16 and control means 17 for providing suitable control pulses which make possible a specified control sequence of two H-bridge switching circuits which thereby connect those transformers to a primary DC source 14 of electrical energy during selected time intervals. FIG. 2 shows a typical structure of primary DC source 14. Primary DC source 14 provides a voltage $U_1$.

Primary DC source 14 receives AC electrical energy through power lines 24, 25, 26, comprises e.g. a 6-diode bridge rectifier circuit, and a filter formed by an inductor 28 and a capacitor 29.

As can be appreciated from FIG. 1, this embodiment comprises a filtering inductor 18 connected in series with one of the terminal outputs of the bridge rectifier 16.

As will become apparent from the following description the DC-DC converter shown in FIG. 1 makes it possible
 to establish a parallel connection or a serial connection of the energy sources represented by the outputs of the transformers 11 and 12 during predetermined time intervals, and
 to effect a smooth and practically continuous transition from the parallel connection to the serial connection or vice versa.

Figure 20:
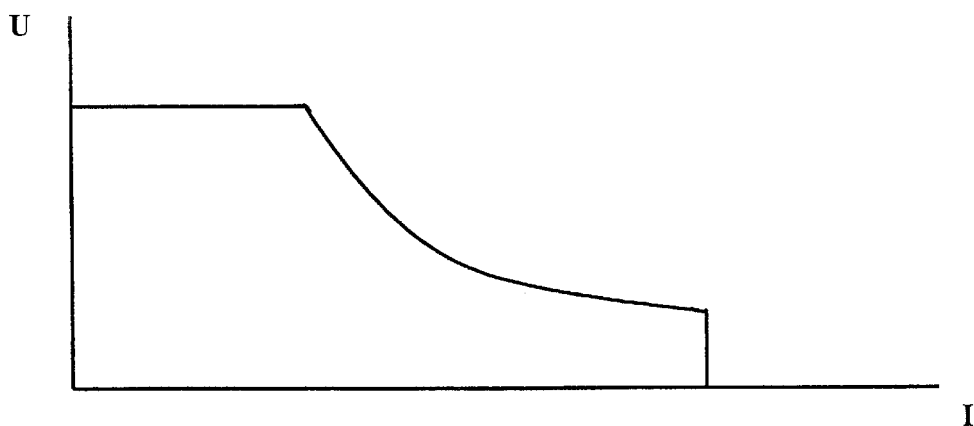
FIG. 20 shows a typical U-I output characteristic of a power supply according to the invention.

These effects obtained with the DC-DC converter shown in FIG. 1 give the power supply according to the invention the capability of providing a constant electrical power to an electrical load, e.g. a plasma, the impedance of which varies within a relatively broad range. This can be appreciated from FIG. 20 which shows a typical U-I output characteristic of a power supply according to the invention.

The DC-DC converter of the power supply shown in FIG. 1 comprises:
 a first transformer 11 and a second transformer 12,
 a first H-bridge switching circuit 13 comprising switching elements 131, 132, 133, 134,
 a second H-bridge switching circuit 15 comprising switching elements 151, 152, 153, 154,
 a bridge rectifier circuit 16, and
 a control circuit 17.

Figure 5:
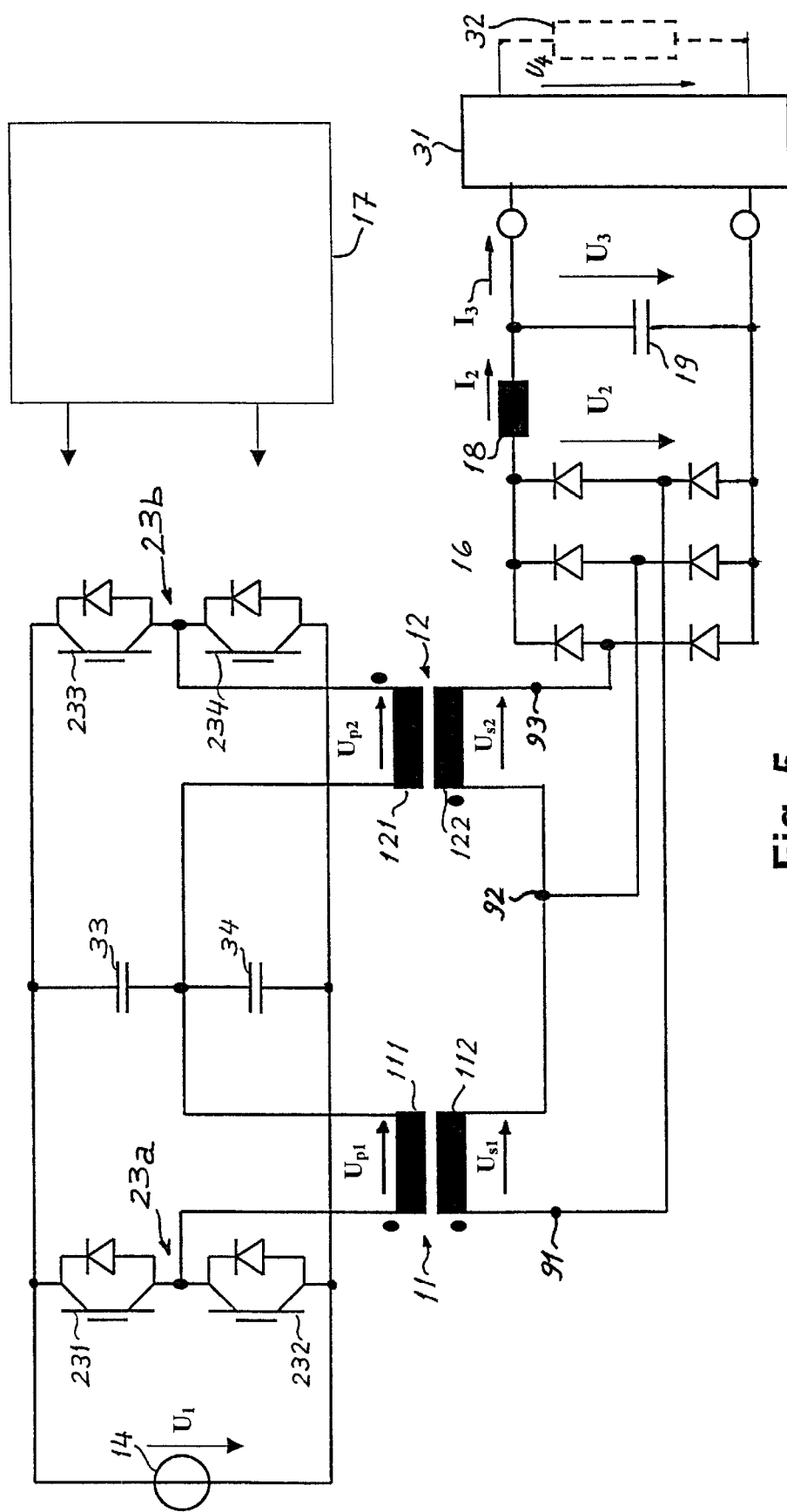
FIG. 5 shows a second embodiment of a power supply according to the invention.

Each of the switching elements 131, 132, 133, 134, 151, 152, 153, 154, and switching elements 231, 232, 233, 234 mentioned below with reference to FIG. 5 is e.g. an IGBT or a MOSFET and is connected in parallel with a diode as shown in the accompanying drawings.

First transformer 11 has a primary winding 111 and a secondary winding 112. The primary winding and the secondary winding of first transformer 11 have the same winding polarity.

Second transformer 12 has a primary winding 121 and a secondary winding 122. The primary winding and the secondary winding of the second transformer 12 have opposite winding polarities.

The secondary winding 112 of first transformer 11 has a terminal which is a first transformer output terminal 91.

Another terminal of secondary winding 112 of first transformer 11 and a terminal of secondary winding 122 of second transformer 12 are connected with each other at a node which is a second transformer output terminal 92.

The secondary winding of the second transformer 12 has a terminal which is a third transformer output terminal 93.

The first H-bridge switching circuit 13 serves for selectively connecting the output of the primary DC source 14 to the primary winding 111 of the first transformer 11. The first H-bridge switching circuit 13 has a leading leg comprising switching elements 131, 132 and a lagging leg comprising switching elements 133, 134.

The second H-bridge switching circuit 15 serves for selectively connecting the output of the primary DC source to the primary winding of the second transformer. The second H-bridge switching circuit 15 has a leading leg comprising switching elements 151, 152 and a lagging leg comprising switching elements 153, 154.

The bridge rectifier circuit 16 is a 6-diode-bridge rectifier circuit having the configuration shown by FIG. 1. Bridge rectifier circuit 16 has a first input terminal 101 connected to the first transformer output terminal 91, a second input terminal 102 connected to the second transformer output terminal 92, a third input terminal 103 connected to the third transformer output terminal 93, and output terminals 161, 162 adapted to provide electrical energy to an electrical load 32, optionally via a filter formed e.g. by an inductor 18 and a capacitor 19, and a so-called "arc control" circuit 31 which is designed to prevent the formation of electrical arcs during a DC plasma processing. Within the scope of the present description "arc control" circuit 31 is a known circuit and is therefore not described in detail.

Figure 3:
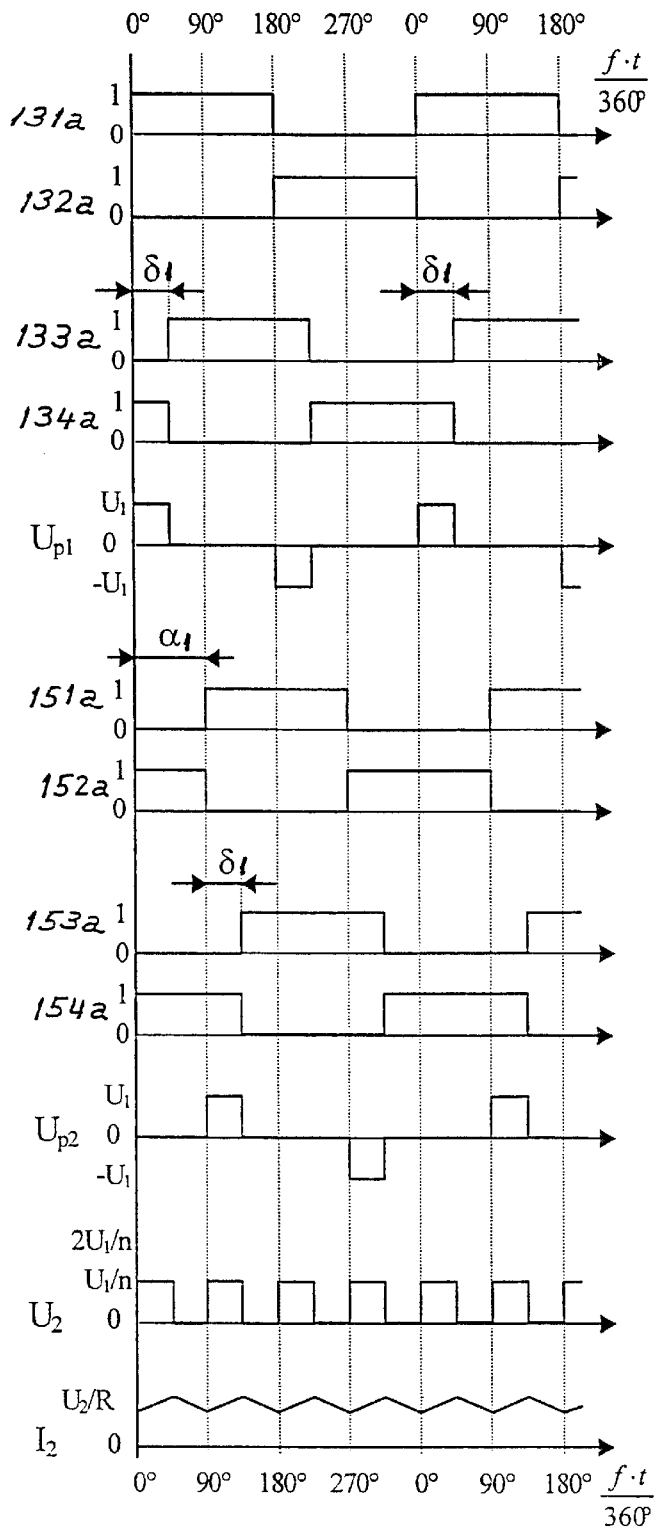
FIG. 3 shows in particular control pulses used for controlling the switching elements of bridges 13 and 15 of switching elements shown in FIG. 1 for a first mode of operation.

Control circuit 17 is adapted to provide the following control pulses:
 a first set of control pulses, e.g. pulses 131a and 132a in FIG. 3 for effecting switching of switching elements 131, 132 of the leading leg of the first H-bridge switching circuit 13, a second set of control pulses, e.g. pulses 133a and 134a in FIG. 3 for effecting switching of switching elements 133, 134 of the lagging leg of the first H-bridge switching circuit 13, this second set of control pulses having an adjustable first phase delay, e.g. phase delay DELTA-1 ($\delta_1$ shown in FIG. 3) with respect to the first set of control pulses, a third set of control pulses, e.g. pulses 151a, 152a in FIG. 3 for effecting switching of switching elements 151, 152 of the leading leg of the second H-bridge switching circuit 15, this third set of control pulses having an adjustable second phase delay, e.g. (phase delay ALPHA-1, $\alpha_1$ shown in FIG. 3) with respect to the first set of control pulses 131a, 132a, a fourth set of control pulses, e.g. pulses 153a, 154a in FIG. 3 for effecting switching of switching elements 153, 154 of the lagging leg of the second H-bridge switching circuit 15, this fourth set of control pulses having an adjustable third phase delay with respect to the third set of control pulses.

In a preferred embodiment, this third phase delay is equal to the first phase delay, e.g. phase delay DELTA-1.

In a preferred embodiment, the control pulses of all above mentioned sets of control pulses have all one and the same predetermined duration.

Two different modes of operation of the above described first embodiment, a first mode of operation called parallel mode and a second mode of operation called parallel/serial mode, are described hereinafter.

As can be appreciated from the following description, a smooth and practically continuous transition from the first mode into the second mode of operation is attainable by suitable selection and adjustment of the phases of the control pulses used to control the switching elements of the H-bridge switching circuits, the selection and adjustment being effected by means of the control circuit which provides the control pulses. The phases of the control pulses are adjusted e.g. by means of a so-called pulse width modulation (PWM).

8.1.1. First Mode of Operation of the First Embodiment (Parallel Mode)

FIG. 3 shows a representation of the control pulses used to control the switching elements of the first and second H-bridge switching circuits 13, 15 shown in FIG. 1, as well as a schematic representation of the corresponding waveforms of primary winding voltages Uplof first transformer 11 and $U_{p2}$ of second transformer 12.

The leading leg of the first H-bridge switching circuit comprises two switching elements 131, 132.

A first set of control pulses 131a, 132a switch switching elements 131, 132 ON and OFF alternately with a duty cycle of about 50% (if a safety dead time between them is disregarded).

The lagging leg of the first H-bridge switching circuit 13 comprises two switching elements 133, 134. A second set of control pulses 133a, 134a switch switching elements 133, 134 ON and OFF alternately also with a duty cycle of about 50% (if a safety dead time between them is disregarded).

As can be appreciated from FIG. 3, the second set of control pulses 133a, 134a has a phase delay DELTA-1 (phase delay $\delta_1$ shown in the drawings) with respect to the first set of control pulses 131a, 132a.

The above described switching of the switching elements of the first H-bridge switching circuit provides a voltage $U_{p1}$ across the primary winding 111 of first transformer 11. Voltage $U_{p1}$ has a waveform which is schematically represented in FIG. 3.

The leading leg of the second H-bridge 15 switching circuit comprises two switching elements 151, 152. A third set of control pulses 151a, 152a switch switching elements 151, 152 ON and OFF alternately with a duty cycle of about 50% (if a safety dead time between them is disregarded).

The lagging leg of the second H-bridge switching circuit comprises two switching elements 153, 154. A fourth set of control pulses 153a, 154a switch switching elements 153, 154 ON and OFF alternately also with a duty cycle of about 50% (if a safety dead time between them is disregarded).

As can be appreciated from FIG. 3, the third set of control pulses 151a, 152a has a phase delay ALPHA-1 (phase delay $\alpha_1$ shown in the drawings) with respect to the first set of control pulses 131a, 132a, and the fourth set of control pulses 153a, 154a has a phase delay DELTA-1 (phase delay $\delta_1$ shown in the drawings) with respect to the third set of control pulses 151a, 152a.

The above described switching of the switching elements of the second H-bridge switching circuit 15 provides a voltage $U_{p2}$ across the primary winding 121 of second transformer 12. Voltage $U_{p2}$ has a waveform which is schematically represented in FIG. 3.

The secondary windings 112 and 122 of transformers 11 and 12 are connected with each other and with 6-diode-bridge rectifier circuit 16 as shown in FIG. 1.

The waveform of the output $U_2$ of bridge rectifier 16 is represented in FIG. 3 under the representation of the waveform of $U_{p2}$.

FIG. 3 illustrates the case where DELTA-1=45 degrees and ALPHA-1=90 degrees. In general for the first mode of operation (parallel mode) the value of DELTA is chosen smaller than 90 degrees and the value of ALPHA is chosen equal to 90 degrees.

By continuously varying the value of the phase delay DELTA-1, it is possible to obtain a corresponding continuous variation of the average output voltage provided at the output of the bridge rectifier 16.

The choice of a phase delay ALPHA-1 equal to 90 degrees has for consequence that secondary voltages of transformers 11 and 12 are rectified one after the other and therefore the rectified voltage provided at the output of bridge rectifier 16 has a frequency which is four times the switching frequency of the H-bridge switching circuits 13, 15.

This provides either a minimization of the ripple of the output current provided by the power supply or a reduction of the size of the filtering inductor used in a conventional power supply for the same amount of electrical power delivered to the load.

The above described first mode of operation (parallel mode) is suitable when a relatively low output voltage is required.

8.1.2. Second Mode of Operation of the First Embodiment (Parallel/serial Mode)

Figure 4:
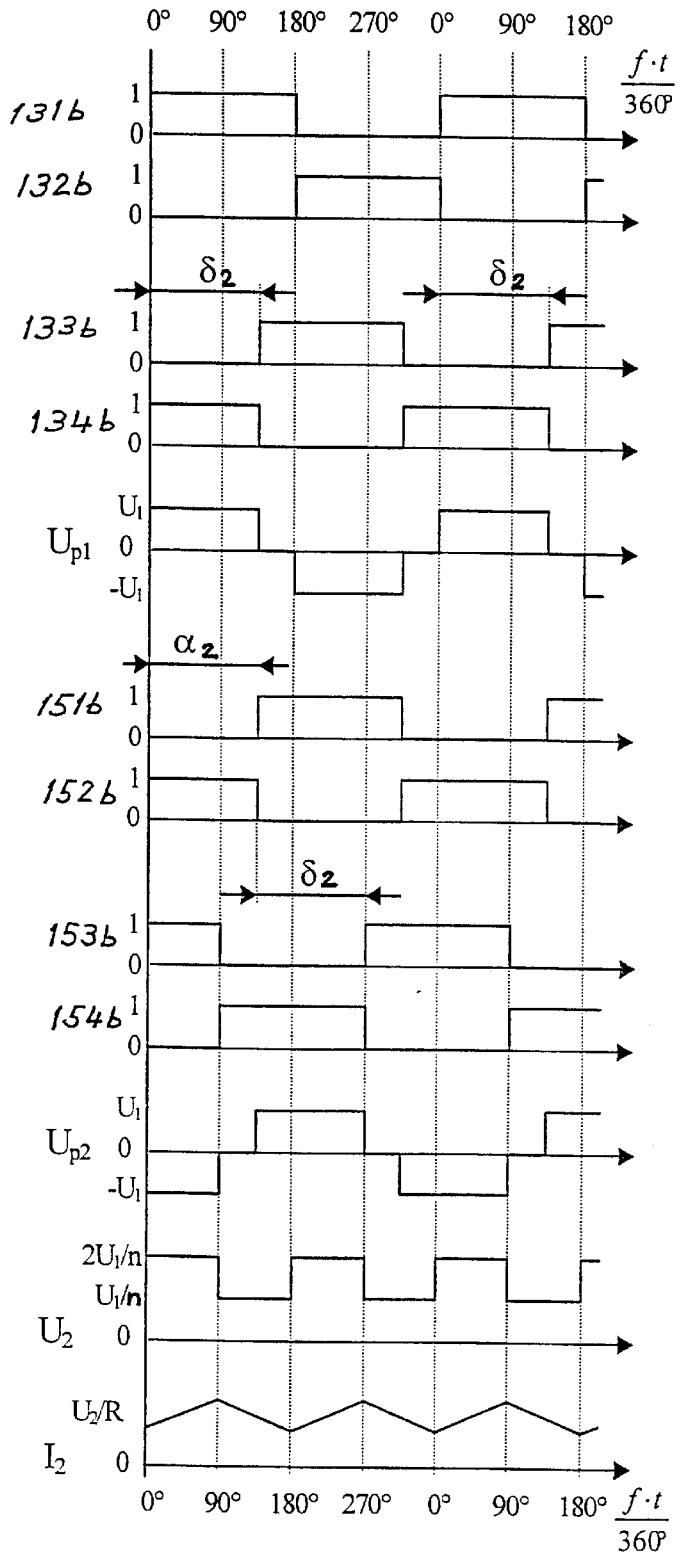
FIG. 4 shows in particular control pulses used for controlling the switching elements of bridges 13 and 15 of switching elements shown in FIG. 1 for a second mode of operation.

An example of the sets of control pulses used to obtain this mode of operation is shown in FIG. 4 which shows diagrams similar and corresponding to those shown in FIG. 3, but for phase delays DELTA-2 ($\delta_2$ shown in FIG. 4) and ALPHA-2 ($\alpha_2$ shown in FIG. 4) which differ from the values of the phase delays DELTA-1 and ALPHA-1 respectively shown in FIG. 3.

In the example illustrated by FIG. 4 DELTA-2=135 degrees and ALPHA-2=135 degrees. In general for the second mode of operation (parallel/serial mode) the value of DELTA-2 is chosen between 90 and 180 degrees and the value of ALPHA-2 is chosen equal to DELTA-2.

In FIG. 4 the first set of control pulses is 131*b*, 132*b*, the second set of control pulses is 133*b*, 134*b*, the third set of control pulses is 151*b*, 152*b*, and the fourth set of control pulses is 153*b*, 154*b*.

FIG. 4 also shows a schematic representation of the waveforms of primary winding voltages $U_{p1}$ and $U_{p2}$ of the first and the second transformer 11, 12 respectively, for the case in which the phase delays are DELTA-2=135 degrees and ALPHA-2=135 degrees.

With this second mode of operation it is also possible to obtain a continuous variation of the average output voltage provided at the output of the bridge rectifier by effecting a corresponding continuous variation of the value of the phase delay DELTA-2 and of the phase delay ALPHA-2=DELTA-2 and the average voltage obtainable at the output of the bridge rectifier is higher than for the first mode of operation and reaches a maximum of twice the voltage provided by a secondary winding of one of the transformers 11, 12 when DELTA is equal to 180 degrees.

As can be appreciated from the example represented by FIG. 4, when phase delay ALPHA-2 delay is equal to phase delay DELTA-2 and is greater than 90 degrees the electrical energy sources represented by the secondary windings of the transformers 11 and 12 are in parallel during predetermined time intervals and in series during other predetermined time intervals.

As can be appreciated from FIG. 1, the secondary winding 122 of the second transformer 12 is of opposite polarity with respect to the primary winding 121 of the second transformer 12, and the primary and secondary windings of the first transformer 11 have the same polarity. Due to this arrangement, the voltages across the secondary windings of the first and second transformers 11, 12 have opposite polarity and the corresponding rectified voltages add together during predetermined time intervals. Due to this, the output voltage of the bridge rectifier will be the double of one of the voltages across a secondary winding of one of the transformers 11, 12 during those intervals.

The ripple frequency is twice the switching frequency of the H-bridge switching circuits. The magnitude of the square voltage is twice lower than in the case of a conventional power supply. The ripple is lower than the ripple obtained with a conventional power supply having the same output filter.

The above described second mode of operation (parallel/serial mode) is suitable when a higher output voltage is required than the one obtainable with the first mode of operation.

8.1.3. Continuous Transition from the First Mode into the Second Mode of Operation As can be appreciated from the foregoing description, a smooth and practically continuous transition from the first mode into the second mode of operation is attainable by suitable selection and adjustment of the phases of the control pulses used to control the switching elements of the H-bridge switching circuits, the selection and adjustment being effected by means of the control circuit 17 which provides the control pulses.

In order to enable the first and second mode of operation and the transition between these two modes, the bridge rectifier circuit 16 is connected to the first transformer output terminal 91, to the third transformer output terminal 93, and to the second transformer output terminal 92, which is, as described above, a node at which the secondary winding 112 of the first transformer 11 and the secondary winding 122 of the second transformer 12 are connected with each other.

Second Embodiment

This embodiment is described with reference to FIGS. 5 to 7.

FIG. 5 schematically shows the basic structure of this second embodiment which is a variant of the basic circuit structure of the first embodiment represented in FIG. 1.

The embodiment shown by FIG. 5 comprises two half bridge switching circuits 23*a* and 23*b* and a primary winding terminal of each of transformers 11 and 12 is connected to a node which is a middle point of a capacitive voltage divider formed by capacitors 33 and 34. The output voltage obtained with this configuration is only half the value of the output voltage obtained with a configuration with two H-bridge switching circuits of the type shown by FIG. 1.

The two half bridge switching circuits 23*a* and 23*b* serve for selectively connecting primary DC source 14 to the primary winding of the first transformer 11 and to the primary winding of the second transformer 12. Half bridge switching circuit 23*a* constitutes a first leg which includes switching elements 231 and 232 and half bridge switching circuit 23*b* constitutes a second leg which includes switching elements 231 and 232.

A circuit formed by a series connection of a first capacitor 33 and a second capacitor 34 is connected in parallel with the first leg 231, 232 and with the second leg 233, 234, and that circuit has a node to which a terminal of capacitor 33 and a terminal of capacitor 34 are connected to. The latter node is connected to a terminal of each of the primary windings of transformers 11 and 12.

Figure 6:
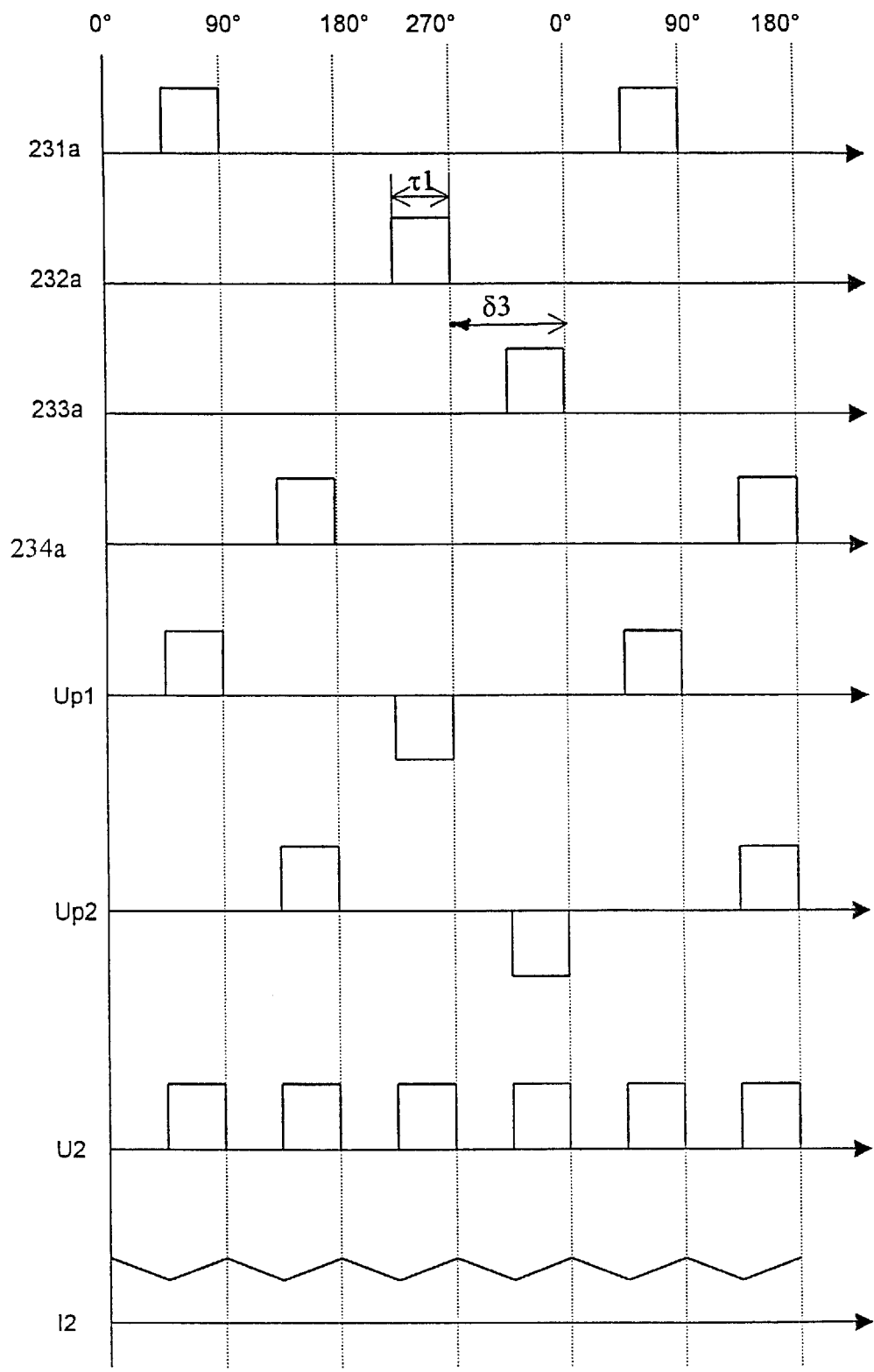
FIG. 6 shows in particular control pulses used for controlling the switching elements of half bridges 23a and 23b of switching elements shown in FIG. 5 for a first mode of operation.
Figure 7:
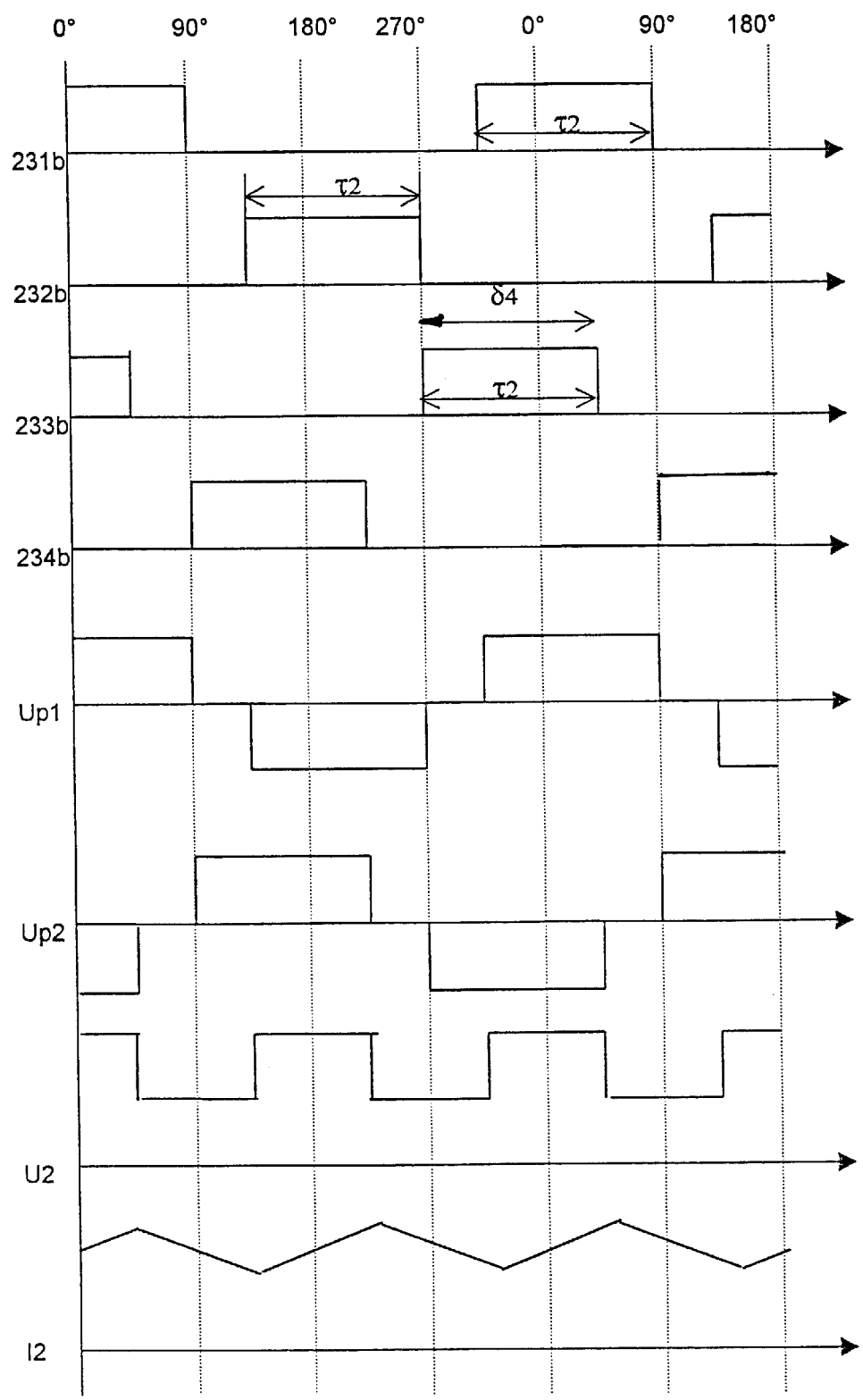
FIG. 7 shows in particular control pulses used for controlling the switching elements of half bridges 23a and 23b of switching elements shown in FIG. 5 for a second mode of operation.

The embodiment shown by FIG. 5 comprises a bridge rectifier circuit 16 of the same type described above with reference to FIG. 1 and a control circuit 17 which provides sets of control pulses shown in FIGS. 6 and 7.

Control circuit provides e.g. the following sets of control pulses shown e.g. in FIG. 6:

a first set of control pulses 231*a*, 232*a* for effecting switching of switching elements 231, 232 of the first leg formed by half bridge switching circuit 23*a*, each of the control pulses of the first set having an adjustable duration, a second set of control pulses 233*a*, 234*a* for effecting switching of switching elements 233, 234 of the second leg formed by half bridge switching circuit 23*b*, each of the control pulses of the second set having an adjustable duration.

In a preferred embodiment the adjustable duration of each of the control pulses of the second set of control pulses is equal to the adjustable duration of each of the control pulses of the first set of control pulses.

The control of the switching elements shown in FIG. 5 is to some extent similar to the control of the switching elements shown in FIG. 1.

FIG. 6 shows the sets of control pulses for the parallel mode of the embodiment shown by FIG. 5 with a control pulse duration TAU-1=45 degrees ($\tau_1$=45 degrees).

In FIG. 6 the first set of control pulses is 231*a*, 232*a* and the second set of control pulses is 233*a*, 234*a*. The second set of control pulses 233*a*, 234*a* has a predetermined phase delay DELTA-3 ($\delta_3$ in FIG. 6), with respect to the first set of control pulses 231*a*, 232*a*.

FIG. 7 shows the sets of control pulses for the parallel/serial mode of this embodiment with a control pulse duration TAU-2=135 degrees ($\tau_{2=135}$ degrees).

In FIG. 7 the first set of control pulses is 231*b*, 232*b* and the second set of control pulses is 233*b*, 234*b*. The second set of control pulses 233b, 234b has a predetermined phase delay DELTA-4 (84 in FIG. 7), with respect to the first set of control pulses 231b, 232b.

In a preferred embodiment when TAU-1 is smaller than 90 degrees, then DELTA-3 is chosen equal to 90 degrees, and when TAU-2 is greater than 90 degrees, then DELTA-4 is chosen equal to TAU-2.

In order to enable the parallel and the parallel/serial mode of operation and the transition between these two modes, the bridge rectifier circuit 16 is, as described above, connected to the first transformer output terminal 91, to the second transformer output terminal 92, and to the third transformer output terminal 93.

Third Embodiment

This embodiment is described with reference to FIG. 8.

Figure 8:
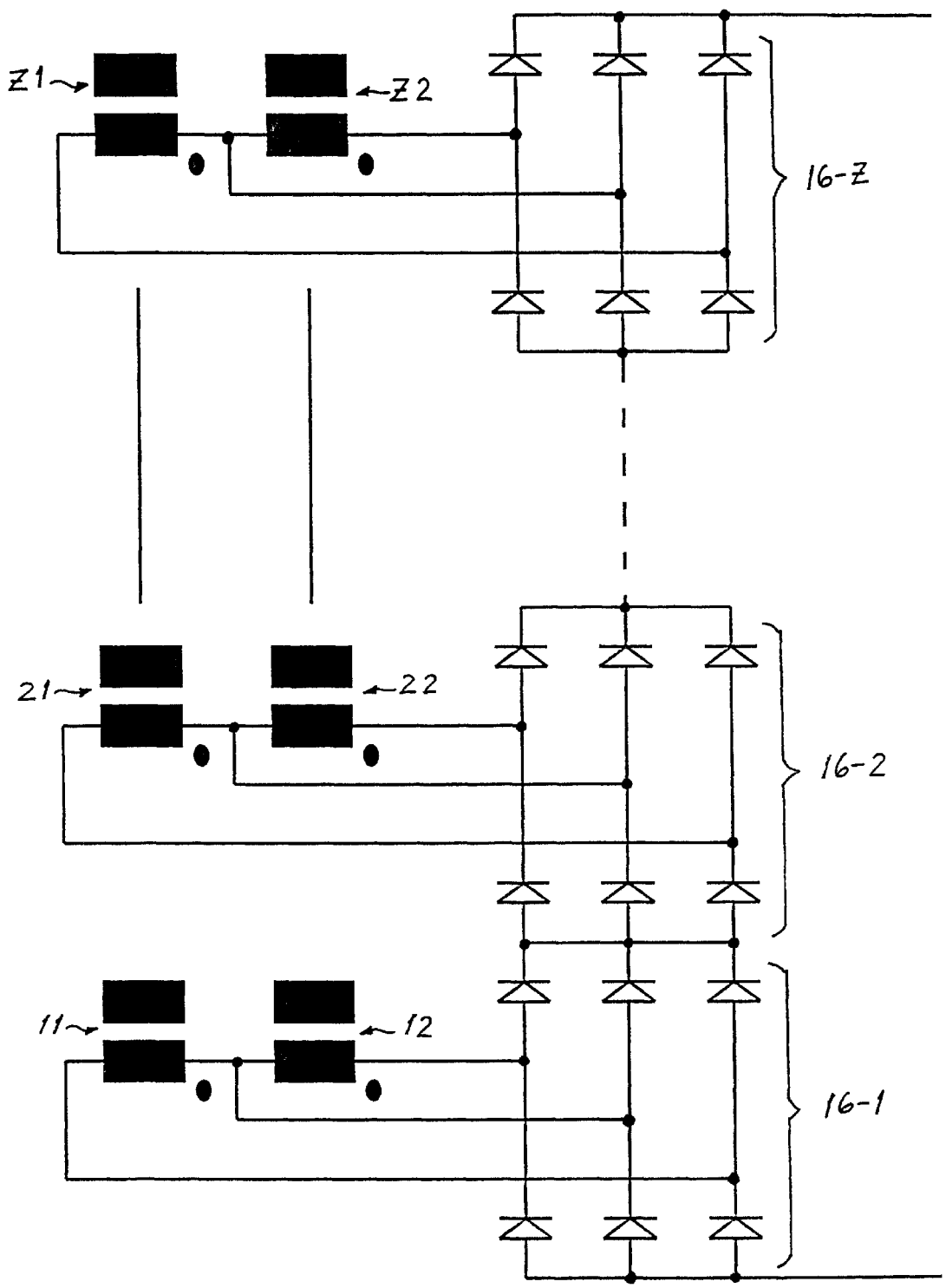
FIG. 8 shows a third embodiment of a power supply according to the invention.

FIG. 8 shows an example of a combination of a plurality of DC-DC converters having the basic structure described above with reference to FIGS. 1 to 4 or of a plurality of DC-DC converters having the basic structure described above with reference to FIGS. 5 to 7 in order to build a power supply having enhanced power supply capabilities, e.g. a higher range of output voltage and/or output current, and having the above mentioned inherent advantages of those basic structures. For this purpose one or more basic structures according to FIG. 1 or to FIG. 5 are combined as shown by FIG. 8. The combined structure can thus comprise 2, 4, 6 and in general 2N transformers.

Fourth Embodiment

Figure 9:
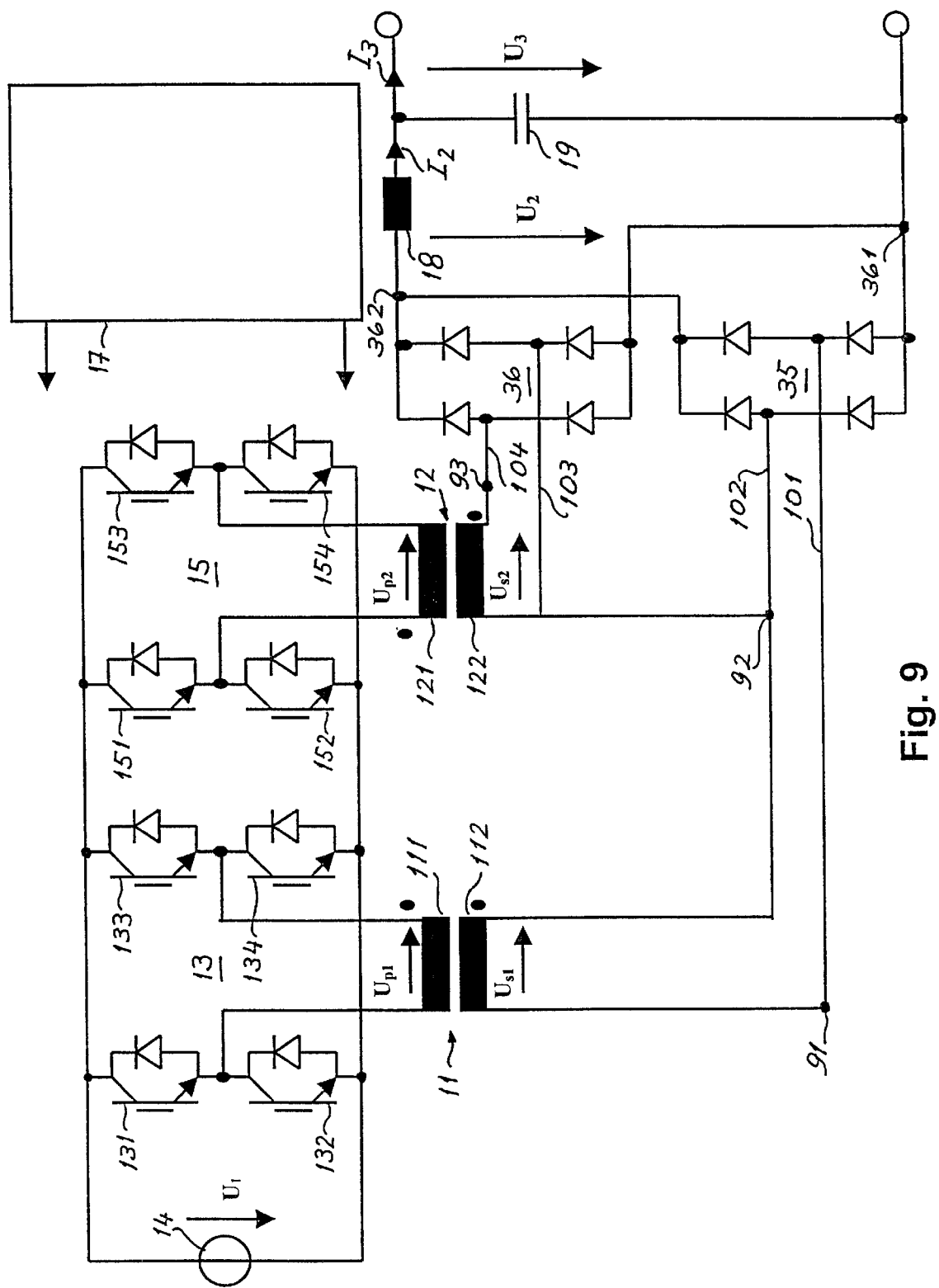
FIG. 9 shows a fourth embodiment of a power supply according to the invention.

This embodiment is described with reference to FIG. 9.

This embodiment has to a large part the basic structure described above with reference to FIG. 1, but differs therefrom in that it comprises two 4-diode bridge rectifiers 35, 36 instead of the 6-diode bridge rectifier 16 shown by FIG. 1.

Bridge rectifier circuit 35 includes four diodes and has
a first input terminal 101 connected to the first transformer output terminal 91, and
a second input terminal 102 connected to the second transformer output terminal 92.

Bridge rectifier circuit 36 includes four diodes and has
a first input terminal 103 connected to the second transformer output terminal 92, and
a second input terminal 104 connected to the third transformer output terminal 93.

The combined bridge rectifier circuit 35–36 has output terminals 361, 362.

Fifth Embodiment

This embodiment is described with reference to FIG. 10.

Figure 10:
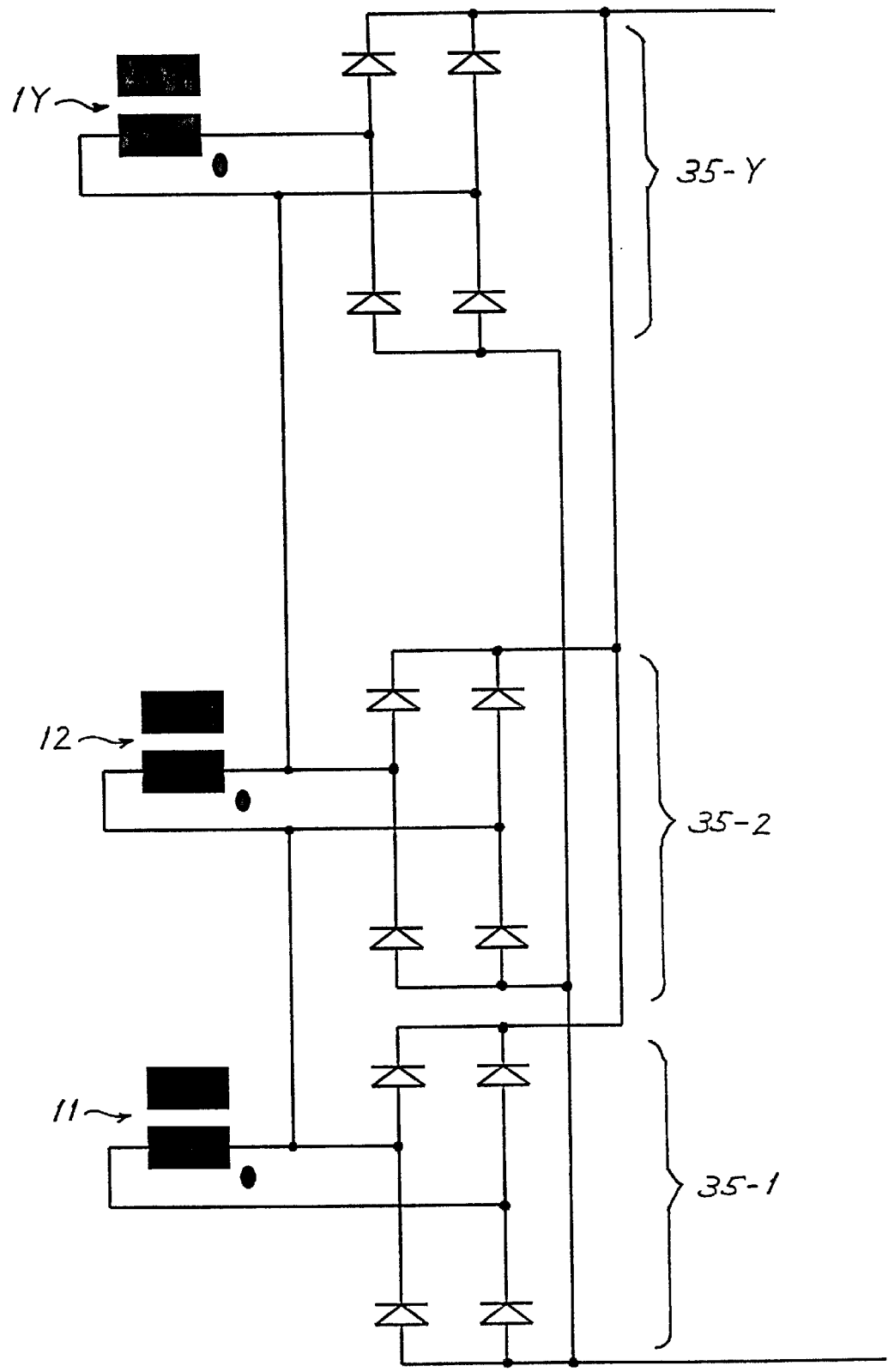
FIG. 10 shows a fifth embodiment of a power supply according to the invention.

FIG. 10 shows an example of a combination of a plurality of DC-DC converters having the basic structure described above with reference to FIG. 9 in order to build a power supply having enhanced power supply capabilities, e.g. a higher range of output voltage and/or output current, and having the above mentioned inherent advantages of those basic structures. For this purpose one or more structures comprising each a transformer and a four-diode bridge rectifier are combined with the basic structure represented in FIG. 9 as shown by FIG. 10. The combined structure can thus comprise 2, 3, 4, and in general N transformers, the minimum number being 2 transformers.

Sixth Embodiment

This embodiment is described with reference to FIG. 11.

Figure 11:
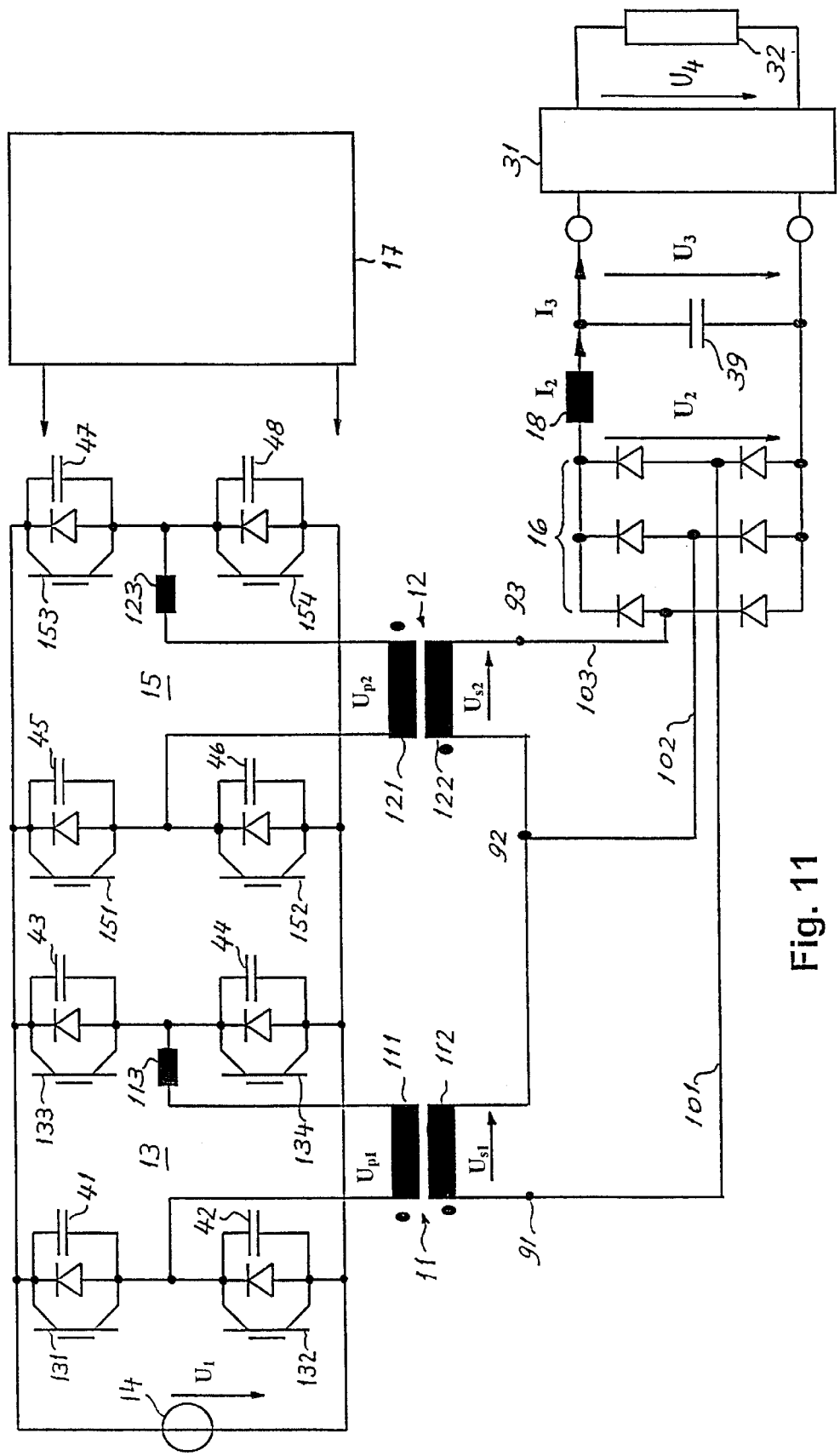
FIG. 11 shows a sixth embodiment of a power supply according to the invention.

FIG. 11 shows a sixth embodiment which is a variant of the basic circuit structure of the first embodiment represented in FIG. 1 and differs therefrom in that it comprises an additional inductor 113, 123 (typical value 50 microhenry) connected in series with each of the primary windings 111, 121 of transformers 11 and 12. Each of the switching elements 131 to 134 and 151 to 154 has a capacitor connected in parallel. In FIG. 11 these capacitors are designated with reference numbers 41 to 48. A typical value for each of these capacitors is 2 to 4 nanofarad.

Inductors 113, 123 shown in FIG. 11 are used to achieve a so-called Zero Voltage Switching (ZVS).

The current flowing through inductors 113, 123 (so-called ZVS inductors) needs some time to pass from the positive to the negative direction and vice versa.

Specially during the switching OFF of the leading leg of a H-bridge, the current flowing through the inductance 18 will flow through the rectifier bridge 16 that will free wheel and short circuit the secondary winding of the transformer and thereby also the primary of the transformer, and due to this effect a very long time is needed for resetting the current flowing through a ZVS inductor. This time requirement causes a loss in duty cycle capability and therefore a loss in output voltage capability. These phenomena do not allow the obtainment of twice the output voltage across the secondary winding when the above mentioned the phase delay DELTA is equal to 180 degrees (loss in duty cycle capability).

As can be appreciated from FIG. 11, this embodiment also comprises a filtering inductor 18 connected in series with one of the terminal outputs of bridge rectifier 16.

Seventh Embodiment

This embodiment is described with reference to FIG. 12.

Figure 12:
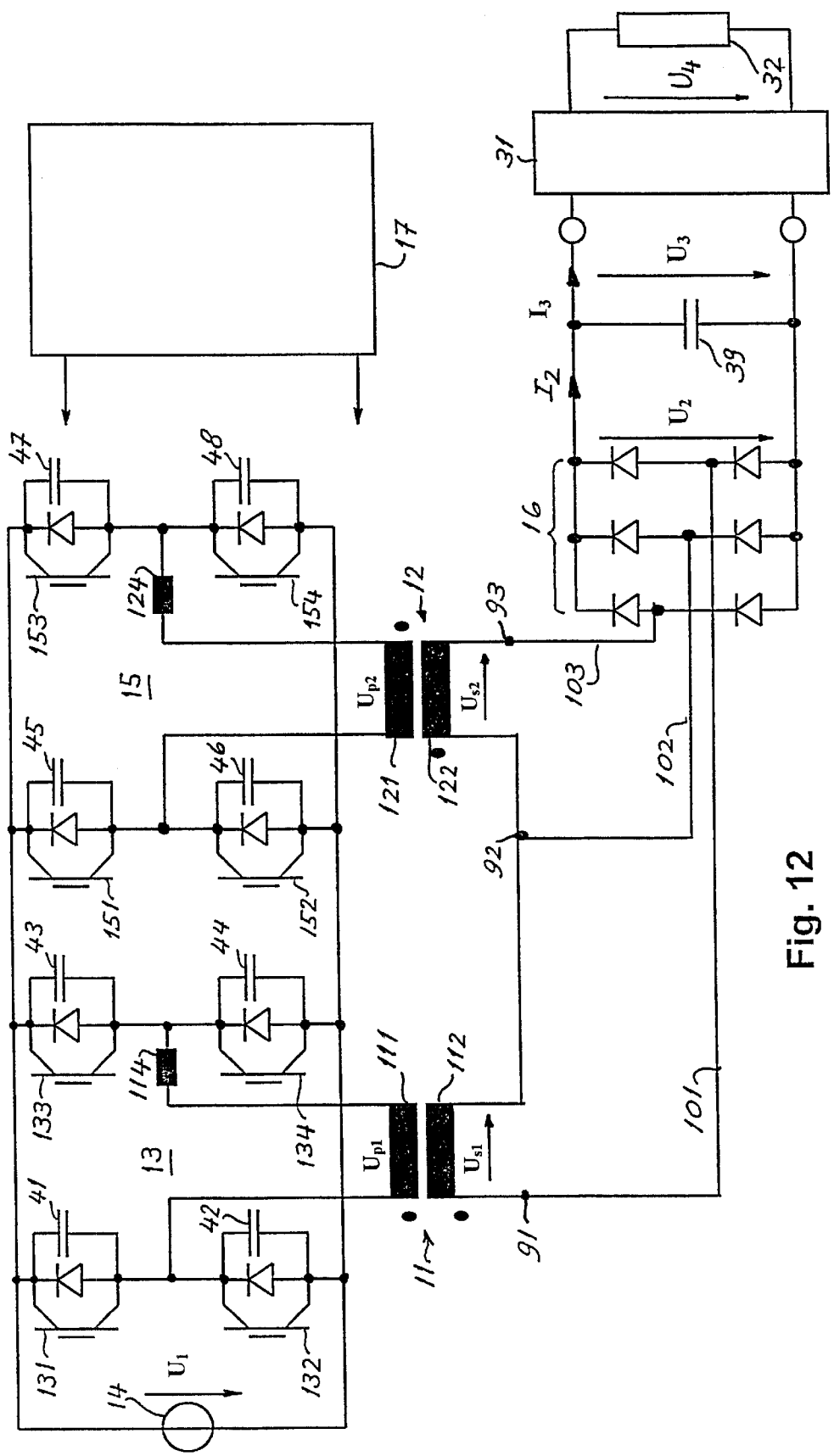
FIG. 12 shows a seventh embodiment of a power supply according to the invention.
Figure 13:
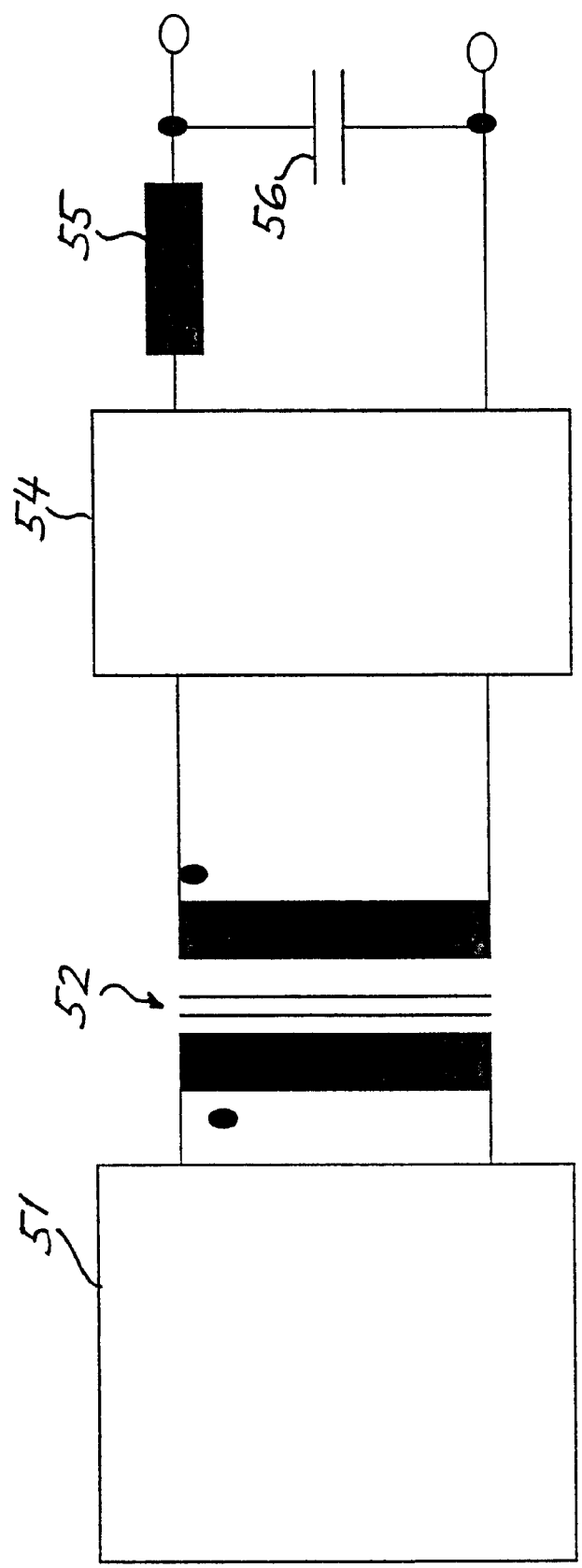
FIG. 13 shows the structure of a conventional power supply.
Figure 16:
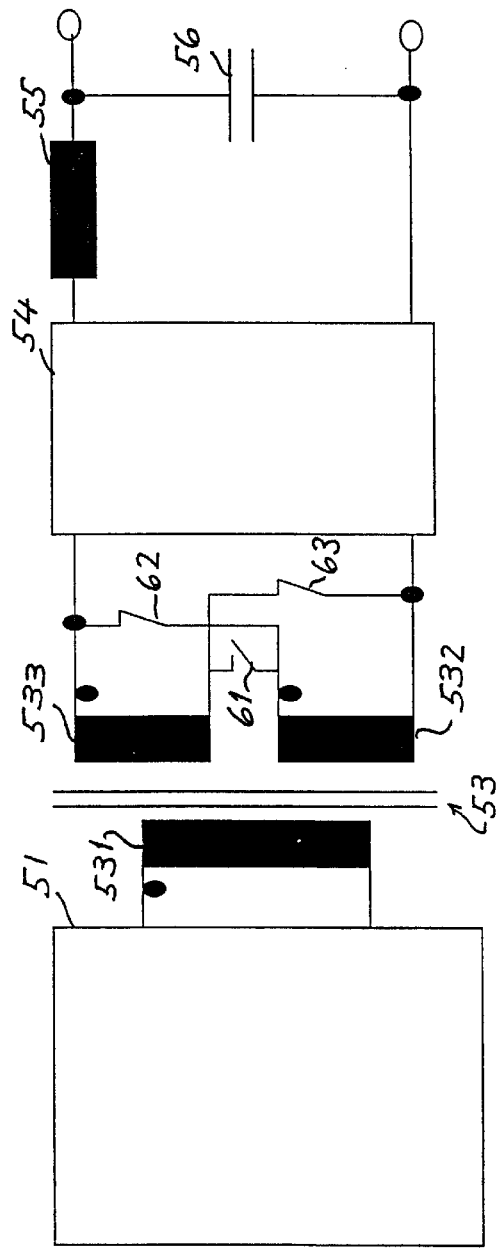
FIG. 16 shows a first connection of secondary windings according to a second prior art approach for enhancing the capabilities of a conventional power supply.
Figure 17:
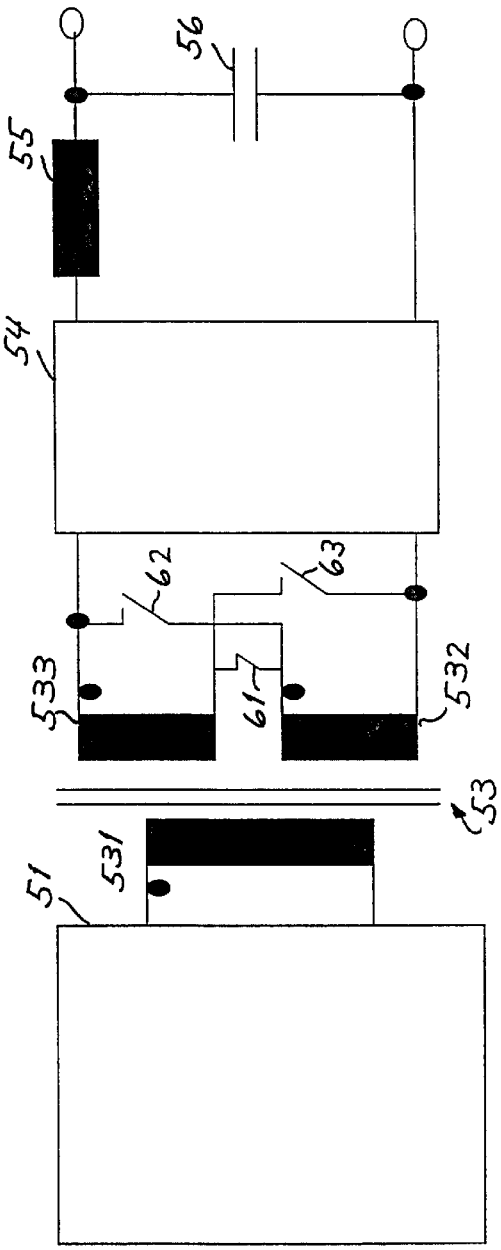
FIG. 17 shows a second connection of secondary windings according to a second prior art approach for enhancing the capabilities of a conventional power supply.
Figure 18:
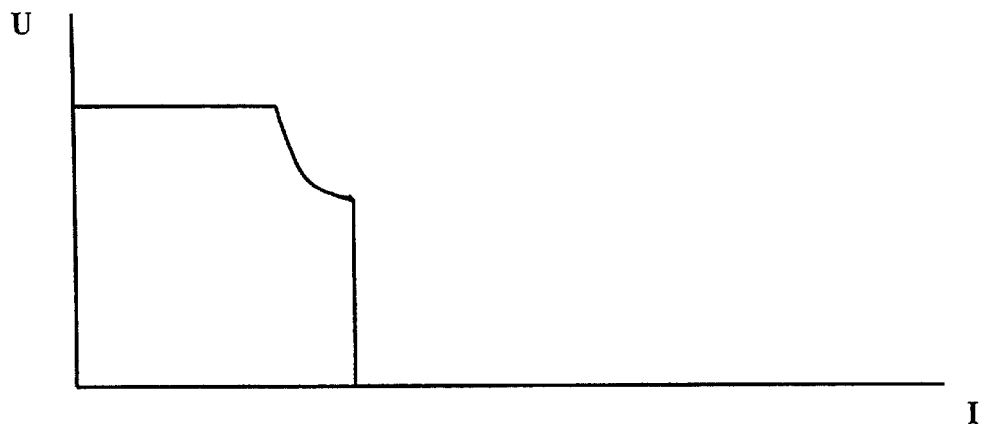
FIG. 18 shows a typical U-I output characteristic of a conventional power supply of the type shown by FIG. 13.
Figure 19:
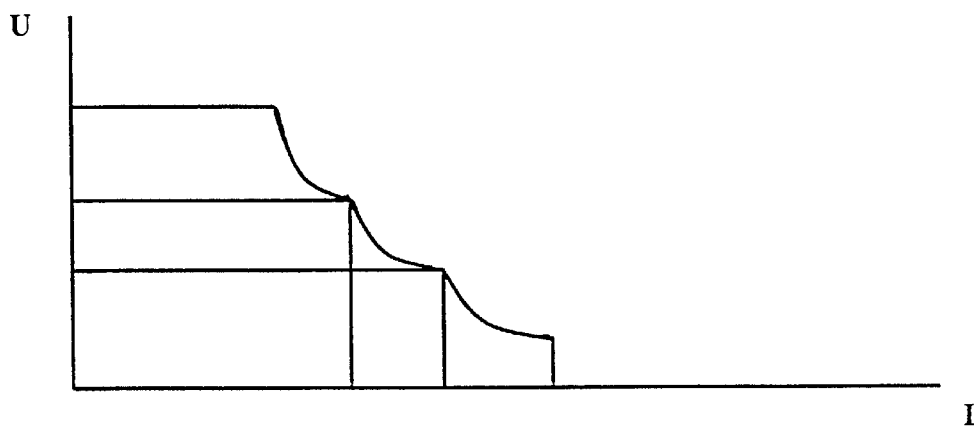
FIG. 19 shows a typical U-I output characteristic of a power supply according to a first prior art approach represented in FIGS. 14 and 15, or according to a second prior art approach represented in FIGS. 16 and 17.

FIG. 12 schematically shows a seventh embodiment which is a variant of the circuit structure of the sixth embodiment represented in FIG. 11 and differs therefrom in that each of the additional inductors 113 and 123 which are connected in series with each of the primary windings of transformers 11 and 12 is replaced by a leakage inductance 114, 124 (typical value 50 microhenry) of the primary winding of the transformer 11 respectively 12, and the filtering inductor 18 connected to the output of bridge rectifier 16 is eliminated, that is the output of the bridge rectifier is connected directly to an output capacitor 39 as shown by FIG. 12.

Removal of the filtering inductor 18 and connection of the output capacitor 39 (typical value 0.5 microfarad) directly across the output of bridge rectifier 16 has two effects. A first effect is that the leakage inductance 114 (124), now the ZVS inductance, of the transformer is used not only for the purpose of ZVS, but also for the performing the filtering of the output signal provided by the power supply. A second effect is that the voltage on capacitor 39 across the output of bridge rectifier 16 is the output voltage, that this voltage corresponds to the transformer secondary voltage and therefore also corresponds to the voltage across the primary winding of the transformer, then the primary winding is not anymore short-circuited. Therefore, eventually the resetting of the ZVS inductance current will be very short and therefore the loss in duty cycle capability is substantially reduced.

LIST OF REFERENCE NUMBERS 11 transformer
12 transformer
13 H-bridge switching circuit
14 primary DC source
15 H-bridge switching circuit
16 bridge rectifier circuit
17 control circuit
18 inductor
19 capacitor 20
21 transformer
22 transformer
23a half bridge switching circuit
23b half bridge switching circuit
24 power line
25 power line
26 power line
27 bridge rectifier circuit
28 inductor
29 capacitor
30
31 "arc control" circuit
32 electrical load
33 capacitor
34 capacitor
35 bridge rectifier circuit
36 bridge rectifier circuit
37
38
39 capacitor
40
41 capacitor
42 capacitor
43 capacitor
44 capacitor
45 capacitor
46 capacitor
47 capacitor
48 capacitor
49
50
51 H-bridge switching circuit
52 transformer
53 transformer
54 rectifier
55 inductor
56 capacitor
57
58
59
60
91 transformer output terminal
92 transformer output terminal
93 transformer output terminal
100
101 input terminal of bridge rectifier
102 input terminal of bridge rectifier
103 input terminal of bridge rectifier
104 input terminal of bridge rectifier
111 primary winding
112 secondary winding
113 inductor
114 leakage inductance of transformer 11 seen from its primary winding
121 primary winding
122 secondary winding
123 inductor
124 leakage inductance of transformer 12 seen from its primary winding
131 switching element
132 switching element
133 switching element
134 switching element
151 switching element
152 switching element
153 switching element
154 switching element
161 output terminal
162 output terminal
231 switching element
232 switching element
233 switching element
234 switching element
361 output terminal
362 output terminal
531 primary winding
532 secondary winding
533 secondary winding
$U_1$ DC output voltage of primary DC source 14
$U_2$ unfiltered output voltage of bridge rectifier 16
$U_3$ filtered output voltage of bridge rectifier 16
$U_4$ output voltage of "arc control" circuit
$U_{P1}$ voltage across the primary winding of first transformer 11
$U_{P2}$ voltage across the primary winding of second transformer 12.
n transformer ratio
$I_2$ output current of bridge rectifier
$I_3$ output current of DC-DC converter
$I_4$ output current of "arc control" circuit
δ DELTA, phase delay
α ALPHA, phase delay
τ TAU, duration expressed as a fraction of a period of 360 degrees Although a preferred embodiment of the invention has been described using specific terms, such description is for illustrative purposes only, and it is to be understood that changes and variations may be made without departing from the spirit or scope of the following claims.

What is claimed is:

1. A power supply comprising a DC-DC converter which comprises
    (a) a first transformer having a primary winding and a secondary winding, said primary winding and said secondary winding of said first transformer having the same winding polarity;
    (b) a second transformer having a primary winding and a secondary winding, said primary winding and said secondary winding of said second transformer having opposite winding polarities;
    said secondary winding of said first transformer having a terminal which is a first transformer output terminal,
    another terminal of said secondary winding of said first transformer and a terminal of said secondary winding of said second transformer being connected with each other at a node which is a second transformer output terminal, and
    said secondary winding of said second transformer having a terminal which is a third transformer output terminal;
    (c) a first H-bridge switching circuit for selectively connecting a primary DC source to the primary winding of said first transformer, said first H-bridge switching circuit having a leading leg and a lagging leg, each of these legs including switching elements;
    (d) a second H-bridge switching circuit for selectively connecting said primary DC source to the primary winding of said second transformer, said second H-bridge switching circuit having a leading leg and a lagging leg, each of these legs including switching elements;
    (e) a bridge rectifier circuit connected to the secondary windings of said first and second transformers;

(f) a control circuit for providing
  (f.1) a first set of control pulses for effecting switching of switching elements of said leading leg of said first H-bridge switching circuit,
  (f.2) a second set of control pulses for effecting switching of switching elements of said lagging leg of said first H-bridge switching circuit,
  said second set of control pulses having an adjustable first phase delay with respect to said first set of control pulses,
  (f.3) a third set of control pulses for effecting switching of switching elements of said leading leg of said second H-bridge switching circuit,
  said third set of control pulses having an adjustable second phase delay with respect to said first set of control pulses,
  (f.4) a fourth set of control pulses for effecting switching of switching elements of said lagging leg of said second H-bridge switching circuit,
  said fourth set of control pulses having an adjustable third phase delay with respect to said third set of control pulses.

2. A power supply according to claim 1, wherein said third phase delay is equal to said first phase delay.

3. A power supply according to claim 1, wherein said control pulses of all said sets of control pulses have all one and the same predetermined duration.

4. A power supply comprising a DC-DC converter which comprises
  (a) a first transformer having a primary winding and a secondary winding, said primary winding and said secondary winding of said first transformer having the same winding polarity;
  (b) a second transformer having a primary winding and a secondary winding, said primary winding and said secondary winding of said second transformer having opposite winding polarities;
  said secondary winding of said first transformer having a terminal which is a first transformer output terminal,
  another terminal of said secondary winding of said first transformer and a terminal of said secondary winding of said second transformer being connected with each other at a node which is a second transformer output terminal, and
  said secondary winding of said second transformer having a terminal which is a third transformer output terminal;
  (c) a first half bridge switching circuit and a second half bridge switching circuit for selectively connecting a primary DC source to the primary winding of said first transformer and to the primary winding of said second transformer, said first half bridge switching circuit forming a first leg, said second half bridge switching circuit forming a second leg, each of these legs including switching elements;
  (d) a circuit formed by a series connection of a first capacitor and a second capacitor, said circuit being connected in parallel with said first leg and with said second leg,
  said circuit formed by said series connection of said first capacitor and said second capacitor having a node which a terminal of each of said first and second capacitors is connected to,
  said node being connected to a terminal of each of said primary windings of said first and said second transformers;
  (e) a bridge rectifier circuit connected to the secondary windings of said first and second transformers;
  (f) a control circuit for providing
  (f.1) a first set of control pulses for effecting switching of switching elements of said first leg formed by said first half bridge switching circuit, each of said control pulses of said first set having an adjustable duration,
  (f.2) a second set of control pulses for effecting switching of switching elements of said second leg formed by said second half bridge switching circuit, each of said control pulses of said second set having an adjustable duration,
  said second set of control pulses having a predetermined phase delay with respect to said first set of control pulses.

5. A power supply according to claim 4, wherein said adjustable duration of each of the control pulses of said second set of control pulses is equal to said adjustable duration of each of the control pulses of said first set of control pulses.

6. A power supply according to claim 1, wherein said bridge rectifier circuit has
  a first input terminal connected to said first transformer output terminal,
  a second input terminal connected to said second transformer output terminal,
  a third input terminal connected to said third transformer output terminal, and output terminals.

7. A power supply according to claim 1, wherein said bridge rectifier circuit includes six diodes.

8. A power supply according to claim 1, wherein said bridge rectifier circuit comprises
  (i) a first bridge rectifier circuit including four diodes and having
    a first input terminal connected to said first transformer output terminal, and
    a second input terminal connected to said second transformer output terminal,
  (ii) a second bridge rectifier circuit including four diodes and having
    a first input terminal connected to said second transformer output terminal, and
    a second input terminal connected to said third transformer output terminal, and
  (iii) output terminals.

9. A power supply comprising a combination of a plurality of DC-DC converters of the kind defined in claim 1.

10. A power supply according to claim 1, further comprising means for performing zero voltage switching of the switching elements of said H-bridge switching circuits.

11. A power supply according to claim 10, wherein said means for performing zero voltage switching comprise the inductance of a first inductor connected in series with the primary winding of said first transformer, the inductance of a second inductor connected in series with the primary winding of said second transformer, and capacitors each being connected in parallel with a respective switching element.

12. A power supply according to claim 11, wherein the leakage inductance of said first transformer is used instead of said first inductor or the leakage inductance of said second transformer is used instead of said second inductor.

13. A power supply according to claim 11, wherein the leakage inductance of said first transformer is used instead of said first inductor and the leakage inductance of said second transformer is used instead of said second inductor.

14. A power supply according to claim 13, wherein leakage inductances of said first transformer and said second transformer are exclusively used as inductances for performing said zero voltage switching.

15. A power supply according to claim 13, wherein leakage inductances of said first transformer and said second transformer are exclusively used instead of an output filtering inductor which would otherwise be connected in series with an output terminal of said bridge rectifier.

16. A power supply according to claim 11, wherein said means for performing said zero voltage switching further comprise a capacitor connected across the output terminals of said bridge rectifier, said capacitor serving for reducing the resetting time of said inductances for performing said zero voltage switching.

17. A power supply according to claim 4, wherein said means for performing zero voltage switching comprise the inductance of a first inductor connected in series with the primary winding of said first transformer, the inductance of a second inductor connected in series with the primary winding of said second transformer, and capacitors each being connected in parallel with a respective switching element.

18. A power supply according to claim 17, wherein the leakage inductance of said first transformer is used instead of said first inductor or the leakage inductance of said second transformer is used instead of said second inductor.

19. A power supply according to claim 17, wherein the leakage inductance of said first transformer is used instead of said first inductor and the leakage inductance of said second transformer is used instead of said second inductor.

20. A power supply according to claim 19, wherein leakage inductances of said first transformer and said second transformer are exclusively used as inductances for performing said zero voltage switching.

21. A power supply according to claim 19, wherein leakage inductances of said first transformer and said second transformer are exclusively used instead of an output filtering inductor which would otherwise be connected in series with an output terminal of said bridge rectifier.

22. A power supply according to claim 17, wherein said means for performing said zero voltage switching further comprise a capacitor connected across the output terminals of said bridge rectifier, said capacitor serving for reducing the resetting time of said inductances for performing said zero voltage switching.

23. A power supply according to claim 1 characterized in that it is so configured and dimensioned that it is particularly suitable for plasma processing.

24. A power supply according to claim 4, wherein said bridge rectifier circuit has
  a first input terminal connected to said first transformer output terminal,
  a second input terminal connected to said second transformer output terminal,
  a third input terminal connected to said third transformer output terminal, and
  output terminals.

25. A power supply according to claim 4, wherein said bridge rectifier circuit includes six diodes.

26. A power supply according to claim 4, wherein said bridge rectifier circuit comprises
  (i) a first bridge rectifier circuit including four diodes and having
    a first input terminal connected to said first transformer output terminal, and
    a second input terminal connected to said second transformer output terminal,
  (ii) a second bridge rectifier circuit including four diodes and having
    a first input terminal connected to said second transformer output terminal, and
    a second input terminal connected to said third transformer output terminal, and
  (iii) output terminals.

27. A power supply comprising a combination of a plurality of DC-DC converters of the kind defined in claim 4.

28. A power supply according to claim 4 characterized in that it is so configured and dimensioned that it is particularly suitable for plasma processing.

* * * * *